United States Patent
Sanderovich

(10) Patent No.: US 10,211,893 B2
(45) Date of Patent: Feb. 19, 2019

(54) EFFICIENT CHANNEL ESTIMATION USING GOLAY SEQUENCES

(71) Applicant: QUALCOMM Incorporated, San Diego, CA (US)

(72) Inventor: Amichai Sanderovich, Atlit (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/057,956

(22) Filed: Mar. 1, 2016

(65) Prior Publication Data

US 2016/0308594 A1    Oct. 20, 2016

Related U.S. Application Data

(60) Provisional application No. 62/149,111, filed on Apr. 17, 2015.

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0613* (2013.01); *H04B 7/0684* (2013.01);
(Continued)

(58) Field of Classification Search
CPC .............. H04B 7/0456; H04B 13/0014; H04B 7/0613; H04B 7/0684; H04L 25/022;
(Continued)

(56) References Cited

U.S. PATENT DOCUMENTS

RE42,681 E  *  9/2011  Dabak ............... H04B 7/061
                                                     370/201
8,611,480 B1 * 12/2013  Lee .................. H04L 1/0631
                                                     375/260
(Continued)

FOREIGN PATENT DOCUMENTS

EP        0605119 A2    7/1994

OTHER PUBLICATIONS

Fiedler F., et al., "A New Source of Seed Pairs for Golay Sequences of Length 2m," Journal of Combinatorial Theory, Series A, Academic Press, Inc., London, GB, vol. 117, No. 5, Jul. 1, 2010 (Jul. 1, 2010), pp. 589-597, XP026932566, ISSN: 0097-3165, DOI: 10.1016/J.JCTA.2009.12.009 [retrieved on Jan. 4, 2010].

(Continued)

*Primary Examiner* — Syed Haider
(74) *Attorney, Agent, or Firm* — Patterson & Sheridan, LLP

(57) ABSTRACT

Certain aspects of the present disclosure provide an apparatus for wireless communication. The apparatus may generally include a processing system configured to generate a frame comprising a first sequence and a conjugate of the first sequence; and an interface configured to output the frame for transmission to a wireless node, wherein the first sequence and the conjugate of the first known sequence are simultaneously transmitted via first and second transmit chains. The first sequence maybe known by the wireless node prior to the transmission.

28 Claims, 9 Drawing Sheets

(51) Int. Cl.
    *H04B 7/06*    (2006.01)
    *H04L 5/00*    (2006.01)
    *H04L 25/02*    (2006.01)
    *H04L 27/26*    (2006.01)
    *H04J 13/00*    (2011.01)

(52) U.S. Cl.
    CPC ........ *H04J 13/0014* (2013.01); *H04L 5/0014* (2013.01); *H04L 5/0048* (2013.01); *H04L 25/0204* (2013.01); *H04L 25/0224* (2013.01); *H04L 27/2613* (2013.01)

(58) Field of Classification Search
    CPC ............... H04L 25/024; H04L 27/0014; H04L 25/0204; H04L 25/0224
    See application file for complete search history.

(56) References Cited

U.S. PATENT DOCUMENTS

| | | | | |
|---|---|---|---|---|
| 2005/0265478 A1* | 12/2005 | Al-Dhahir | ............ | H04B 7/0669 375/299 |
| 2006/0274841 A1* | 12/2006 | Wang | .................. | H04L 25/0204 375/260 |
| 2009/0163143 A1* | 6/2009 | De Rore | ............ | H04L 25/0212 455/63.1 |
| 2010/0309958 A1* | 12/2010 | Lakkis | ................ | H04J 13/0003 375/146 |
| 2010/0310009 A1* | 12/2010 | Lakkis | ................ | H04J 13/0014 375/308 |
| 2012/0207231 A1* | 8/2012 | Zhang | ................. | H04L 27/2613 375/260 |
| 2014/0003475 A1* | 1/2014 | Xin | ..................... | H04J 13/0014 375/219 |

OTHER PUBLICATIONS

International Search Report and Written Opinion—PCT/US2016/020358—ISA/EPO—Jun. 7, 2016.

Zoltowski M.D., et al., "Complementary Codes based Channel Estimation for MIMO-OFDM Systems," Communication, Control, and Computing, 2008 46th Annual Allerton Conference on, IEEE, Piscataway, NJ, USA, Sep. 23, 2008 (Sep. 23, 2008), pp. 133-138, XP031435142, ISBN: 978-1-4244-2925-7.

* cited by examiner

EFFICIENT CHANNEL ESTIMATION USING GOLAY SEQUENCES

CLAIM OF PRIORITY UNDER 35 U.S.C. § 119

The present application claims the benefit of U.S. Provisional Patent Application Ser. No. 62/149,111, entitled "EFFICIENT CHANNEL ESTIMATION USING GOLAY SEQUENCES" and filed Apr. 17, 2015, which is assigned to the assignee of the present application and hereby expressly incorporated by reference herein in its entirety.

FIELD

Certain aspects of the present disclosure generally relate to wireless communications and, more particularly, to performing signal estimation.

BACKGROUND

In order to address the issue of increasing bandwidth requirements demanded for wireless communications systems, different schemes are being developed to allow multiple user terminals to communicate with a single access point by sharing the channel resources while achieving high data throughputs. Multiple-input multiple-output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_s$ independent channels, which are also referred to as spatial channels, where $N_S \leq \min\{N_T, N_R\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Aspects of the present disclosure provide techniques for MIMO channel estimation using a known sequence and a conjugate of the known sequence.

Certain aspects of the present disclosure provide an apparatus for wireless communication. The apparatus may generally include a processing system configured to generate a frame comprising a first sequence and a conjugate of the first sequence, and an interface configured to output the frame for transmission to a wireless node, wherein the first sequence and the conjugate of the first sequence are simultaneously transmitted via first and second transmit chains, wherein the first sequence is known by the wireless node prior to the transmission.

Certain aspects of the present disclosure provide an apparatus for wireless communication. The apparatus generally includes an interface configured to obtain, from a wireless node, a frame comprising a first sequence and a conjugate of the first sequence simultaneously received at first and second receive chains, wherein the first sequence is known by the apparatus prior to obtaining the frame, and a processing system configured to generate a first signal estimate based on the first sequence as received at the first receive chain, generate a second signal estimate based on the conjugate of the first sequence as received at the first receive chain, generate a third signal estimate based on the first sequence as received at the second receive chain, and generate a fourth signal estimate based on the conjugate of the first sequence as received at the second receive chain, and to generate a multiple input multiple output (MIMO) signal estimate based on the first signal estimate, the second signal estimate, the third signal estimate, and the fourth signal estimate.

Certain aspects of the present disclosure provide a method for wireless communication. The method generally includes generating a frame comprising a first sequence and a conjugate of the first sequence, and outputting the frame for transmission to a wireless node, wherein the first sequence and the conjugate of the first sequence are simultaneously transmitted via first and second transmit chains, wherein the first sequence is known by the wireless node prior to the transmission.

Certain aspects of the present disclosure provide a method for wireless communication. The method generally includes obtaining, by an apparatus and from a wireless node, a frame comprising a first sequence and a conjugate of the first sequence simultaneously received at first and second receive chains, wherein the first sequence is known by the apparatus prior to obtaining the frame, and generating a first signal estimate based on the first sequence as received at the first receive chain, generating a second signal estimate based on the conjugate of the first sequence as received at the first receive chain, generating a third signal estimate based on the first sequence as received at the second receive chain, generating a fourth signal estimate based on the conjugate of the first sequence as received at the second receive chain, and generating a multiple input multiple output (MIMO) signal estimate based on the first signal estimate, the second signal estimate, the third signal estimate, and the fourth signal estimate.

Certain aspects of the present disclosure provide an apparatus for wireless communication. The apparatus generally includes means for generating a frame comprising a first sequence and a conjugate of the first sequence, and means for outputting the frame for transmission to a wireless node, wherein the first sequence and the conjugate of the first sequence are simultaneously transmitted via first and second transmit chains, wherein the first sequence is known by the wireless node prior to the transmission.

Certain aspects of the present disclosure provide an apparatus for wireless communication. The apparatus generally includes means for obtaining, from a wireless node, a frame comprising a first sequence and a conjugate of the first sequence simultaneously received at first and second receive chains, wherein the first sequence is known by the apparatus prior to obtaining the frame, means for generating a first signal estimate based on the first sequence as received at the first receive chain, means for generating a second signal estimate based on the conjugate of the first sequence as received at the first receive chain, means for generating a third signal estimate based on the first sequence as received at the second receive chain, means for generating a fourth signal estimate based on the conjugate of the first sequence as received at the second receive chain, and means for generating a multiple input multiple output (MIMO) signal estimate based on the first signal estimate, the second signal estimate, the third signal estimate, and the fourth signal estimate.

Certain aspects of the present disclosure provide a computer-readable medium comprising instructions executable to generate a frame comprising a first sequence and a conjugate of the first sequence, and output the frame for transmission to a wireless node, wherein the first sequence and the conjugate of the first sequence are simultaneously transmitted via first and second transmit chains, wherein the first sequence is known by the wireless node prior to the transmission.

Certain aspects of the present disclosure provide a computer-readable medium comprising instructions executable to obtain, by an apparatus and from a wireless node, a frame comprising a first sequence and a conjugate of the first sequence simultaneously received at first and second receive chains, generate a first signal estimate based on the first sequence as received at the first receive chain, wherein the first sequence is known by the apparatus prior to obtaining the frame, generate a second signal estimate based on the conjugate of the first sequence as received at the first receive chain, generate a third signal estimate based on the first sequence as received at the second receive chain, generate a fourth signal estimate based on the conjugate of the first sequence as received at the second receive chain, and generate a multiple input multiple output (MIMO) signal estimate based on the first signal estimate, the second signal estimate, the third signal estimate, and the fourth signal estimate.

Certain aspects of the present disclosure provide a wireless node. The wireless node generally includes at least one antenna, and a processing system configured to generate a frame comprising a first sequence and a conjugate of the first sequence, and output the frame for transmission to another wireless node, wherein the first sequence and the conjugate of the first sequence are simultaneously transmitted via first and second transmit chains and the at least one antenna, wherein the first sequence is known by the other wireless node prior to the transmission.

Certain aspects of the present disclosure provide a wireless node. The wireless node generally includes at least one antenna, and a processing system configured to obtain, via the at least one antenna and from another wireless node, a frame comprising a first sequence and a conjugate of the first sequence simultaneously received at first and second receive chains, wherein the first sequence is known by the wireless node prior to obtaining the frame, and generate a first signal estimate based on the first sequence as received at the first receive chain, generate a second signal estimate based on the conjugate of the first sequence as received at the first receive chain, generate a third signal estimate based on the first sequence as received at the second receive chain, generate a fourth signal estimate based on the conjugate of the first sequence as received at the second receive chain, and generate a multiple input multiple output (MIMO) signal estimate based on the first signal estimate, the second signal estimate, the third signal estimate, and the fourth signal estimate.

DETAILED DESCRIPTION

Figure 1:
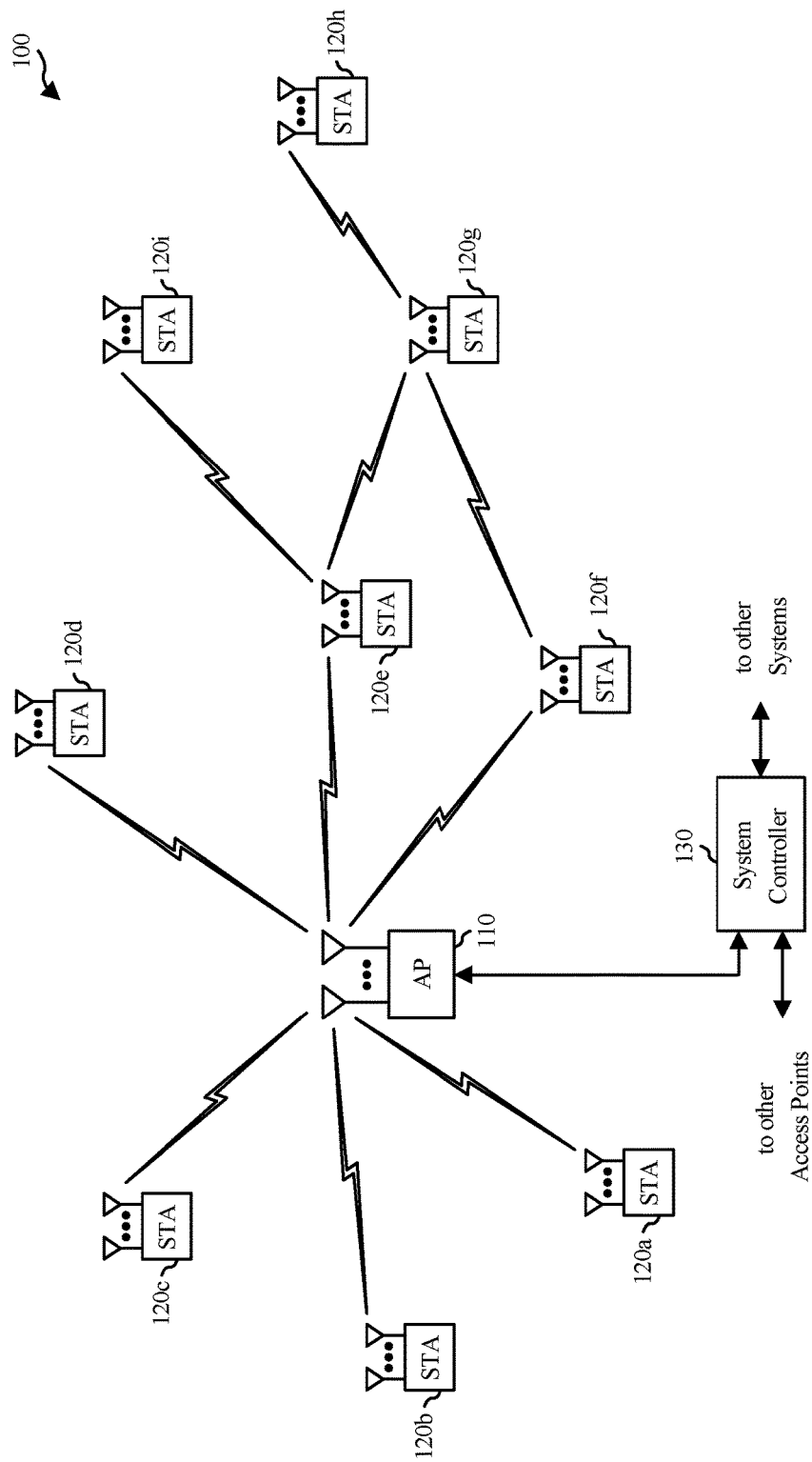
FIG. 1 is a diagram of an example wireless communications network, in accordance with certain aspects of the present disclosure.

Aspects of the present disclosure provide techniques for MIMO channel estimation using a channel estimation sequence (CES) and a conjugate of the CES to reduce overhead. For example, a CES and the conjugate of the CES may be simultaneously transmitted via first and second transmit chains and used by a receiving device for multiple-input-multiple-output (MIMO) channel estimation.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to beamforming training using a multiple-input and multiple-output (MIMO) transmission scheme. For example, existing format of frames in accordance with IEEE 802.11 ad may be adapted to facilitate beamforming using a MIMO transmission scheme.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple stations. A TDMA system may allow multiple stations to share the same frequency channel by dividing the transmission signal into different time slots, each time slot being assigned to different stations. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, an access point 120 may perform beamforming training to improve signal quality during communication with a station (STA) 120. The beamforming training may be performed using a MIMO transmission scheme.

The system 100 may be, for example, a multiple-access multiple-input multiple-output (MIMO) system 100 with access points and stations. For simplicity, only one access point 110 is shown in FIG. 1. An access point is generally a fixed station that communicates with the stations and may also be referred to as a base station or some other terminology. A STA may be fixed or mobile and may also be referred to as a mobile station, a wireless device, or some other terminology. Access point 110 may communicate with one or more STAs 120 at any given moment on the downlink and uplink. The downlink (i.e., forward link) is the communication link from the access point to the STAs, and the uplink (i.e., reverse link) is the communication link from the STAs to the access point. A STA may also communicate peer-to-peer with another STA.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe STAs 120 capable of communicating via Spatial Division Multiple Access (SDMA), for certain aspects, the STAs 120 may also include some STA that do not support SDMA. Thus, for such aspects, an AP 110 may be configured to communicate with both SDMA and non-SDMA STAs. This approach may conveniently allow older versions of STAs ("legacy" stations) to remain deployed in an enterprise, extending their useful lifetime, while allowing newer SDMA STAs to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected STAs 120 collectively represents the multiple-output for downlink transmissions and the multiple-input for uplink transmissions. For pure SDMA, it is desired to have $N_{ap} \geq K \geq 1$ if the data symbol streams for the K STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected STA transmits user-specific data to and/or receives user-specific data from the access point. In general, each selected STA may be equipped with one or multiple antennas (i.e., $N_{ut} \geq 1$). The K selected STAs can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each STA may be equipped with a single antenna (e.g., in order to keep costs down) or multiple antennas (e.g., where the additional cost can be supported). The system 100 may also be a TDMA system if the STAs 120 share the same frequency channel by dividing transmission/reception into different time slots, each time slot being assigned to different STA 120.

Figure 2:
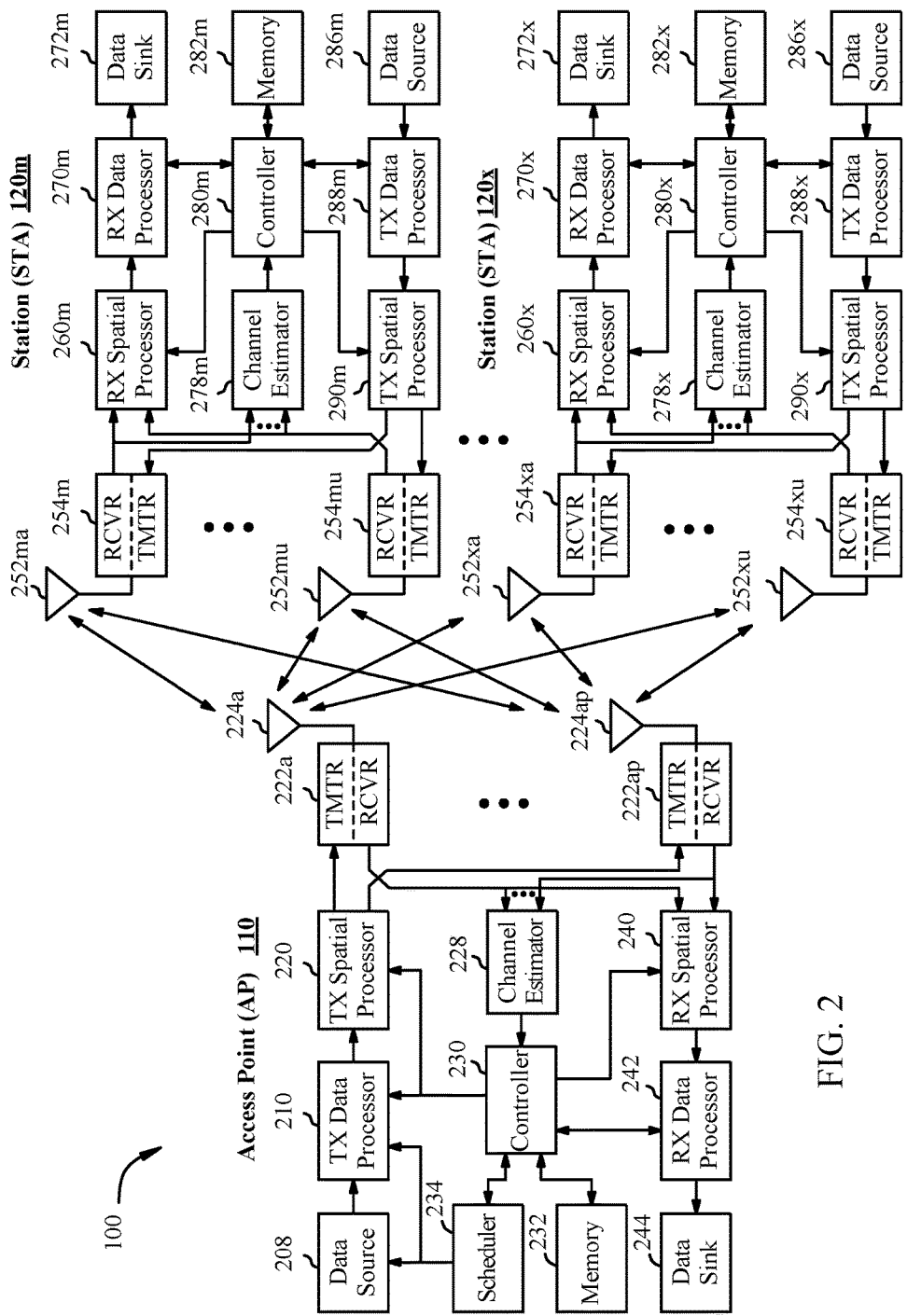
FIG. 2 is a block diagram of an example access point and example user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 or antenna 252, Tx/Rx 254, processors 260, 270, 288, and 290, and/or controller 280 may be used to perform the operations described herein and illustrated with reference to FIGS. 5 and 5A, and/or FIGS. 6 and 6A.

FIG. 2 illustrates a block diagram of access point 110 two STAs 120m and 120x in a MIMO system 100. The access point 110 is equipped with $N_t$ antennas 224a through 224ap. STA 120m is equipped with $N_{ut,m}$ antennas 252ma through 252mu, and STA 120x is equipped with $N_{ut,x}$ antennas 252xa through 252xu. The access point 110 is a transmitting entity for the downlink and a receiving entity for the uplink. Each STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ STA are selected for simultaneous transmission on the uplink, $N_{dn}$ STAs are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and STA.

On the uplink, at each STA 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ STAs may be scheduled for simultaneous transmission on the uplink. Each of these STAs performs spatial processing on its data symbol stream and transmits its set of transmit symbol streams on the uplink to the access point.

At access point 110, $N_{ap}$ antennas 224a through 224ap receive the uplink signals from all $N_{up}$ STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ STAs scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides $N_{dn}$ downlink data symbol streams for the $N_{dn}$ STAs. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STAs. The decoded data for each STA may be provided to a data sink 272 for storage and/or a controller 280 for further processing.

At each STA 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each STA typically derives the spatial filter matrix for the STA based on the downlink channel response matrix $H_{dn,m}$ for that STA. Controller 230 derives the spatial filter matrix for the access point based on the effective uplink channel response matrix $H_{up,eff}$. Controller 280 for each STA may send feedback information (e.g., the downlink and/or uplink eigenvectors, eigenvalues, SNR estimates, and so on) to the access point. Controllers 230 and 280 also control the operation of various processing units at access point 110 and STA 120, respectively.

Figure 3:
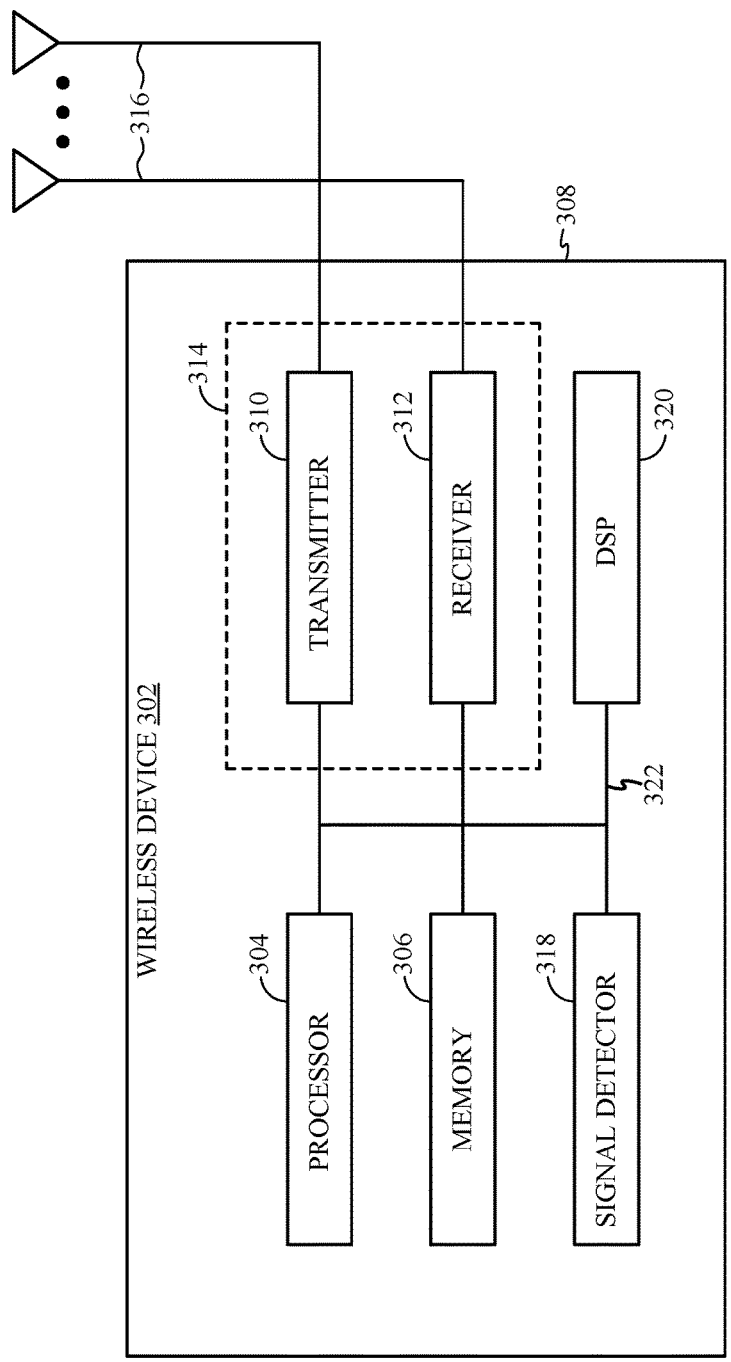
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 500 and 600 illustrated in FIGS. 5 and 6, respectively. The wireless device 302 may be an access point 110 or a STA 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Channel Estimation Using Golay Sequences

Golay sequences are used to estimate signal transmissions (e.g., a channel) between transmitter antennas and receiver antennas. For example, distortions of the signal that occur during transmission may be estimated, which can then be compensated for during future communications. When two or more transmit chains are used, as may be the case for a MIMO system, a channel between each of the transmit chains to the receiver antennas may be estimated. Thus, several repetitions of the channel estimation may be used, each using different combinations of the channel estimation sequences (CES).

The main drawback to this approach is the amount of time it may take for the transmission of the CES sequences. That is, the amount of time it takes to transmit the CES sequences may be equal to a duration for transmission of each sequence multiplied by the number of transmit chains. Therefore, this approach induces significant overhead, especially for next generation devices.

While the IEEE 802.11ad standard defined a CES, the IEEE 802.11ay standard may be adding MIMO capabilities, which may use channel estimation for estimating the MIMO channel.

Moreover, next generation devices may be operated with low (e.g., minimum) overhead to, for example, improve efficiency for 10K-100K payloads, and with low channel estimation error. For example, next generation devices may be operated with channel estimation error of 9 dB over signal to noise ratio (SNR). Next generation devices may also reuse hardware (HW) that may already exist for the IEEE 802.11ad standard, and may use Golay sequences which are easy to implement for high sampling rates.

Figure 4A:
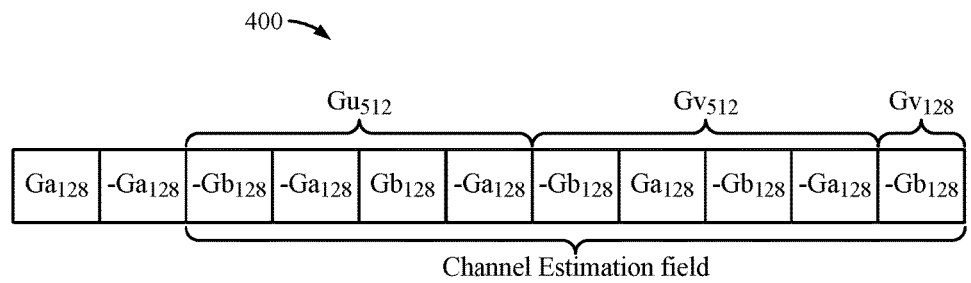
FIG. 4A illustrates an example channel estimation field as used in the 802.11ad standard.

FIG. 4A illustrates an example channel estimation field used for IEEE 802.11ad standard. As illustrated, the IEEE 802.11ad standard uses a CES with a length of 128 Golay sequences. The guard interval (GI) length used by next generation devices may be 64 samples, but channel estimation length may remain as 128 samples. Thus, the excess length may be used for time alignment, if a previous time acquisition was not acceptable. However, actual channel may be shorter than 128 samples (e.g., 72 ns). An ideal Golay correlation may enable clean time domain channel estimation.

Figure 4B:
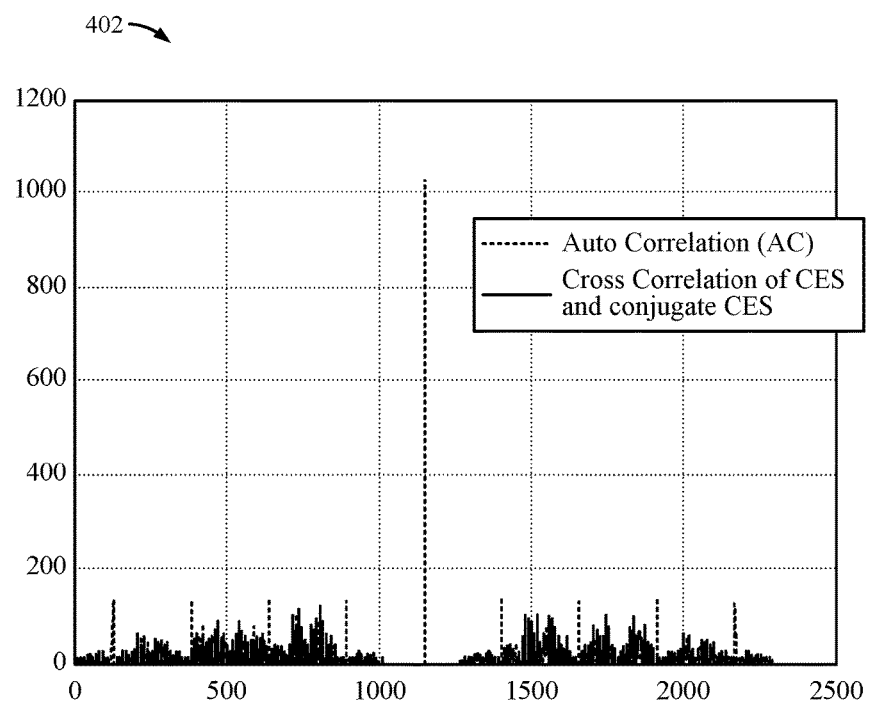
FIG. 4B is a graph illustrating Auto-Correlation (AC) of a CES and Cross-Correlation (CC) of CES and conjugate CES, in accordance with certain aspects of the present disclosure.

FIG. 4B is a graph 402 of Auto-Correlation (AC) of a CES and Cross-Correlation (CC) of CES and conjugate CES. Aspects of the present disclosure take advantage of a property of the IEEE 802.11ad standard Golay sequences, which are rotated by $\pi/2$ shifts (G). Golay sequences with $\pi/2$ shifts are orthogonal with their conjugate (i-jQ) sequences. That is, according to this property, two sequences, G and G*, where G* is the conjugate of G, are orthogonal, as illustrated.

Using this property, one transmit chain can transmit a sequence G and another can transmit a sequence G* simultaneously, thereby reducing transmit time and overhead. For a receiving (RX) device, the two channel estimations can be done simultaneously by reusing a same Golay correlator, once with the conjugate signal corresponding to sequence G* and once with the original signal corresponding to sequence G, as will be described in more detail with respect to FIGS. 5-8.

While aspects of the present disclosure are described with respect to CES, any sequence known by both the TX device and RX device may be used. For example, a known sequence may be used to perform signal estimation. For example, the RX device may determine timing and phase distortions of a signal via the known sequence and the conjugate of the known sequence.

Figure 5:
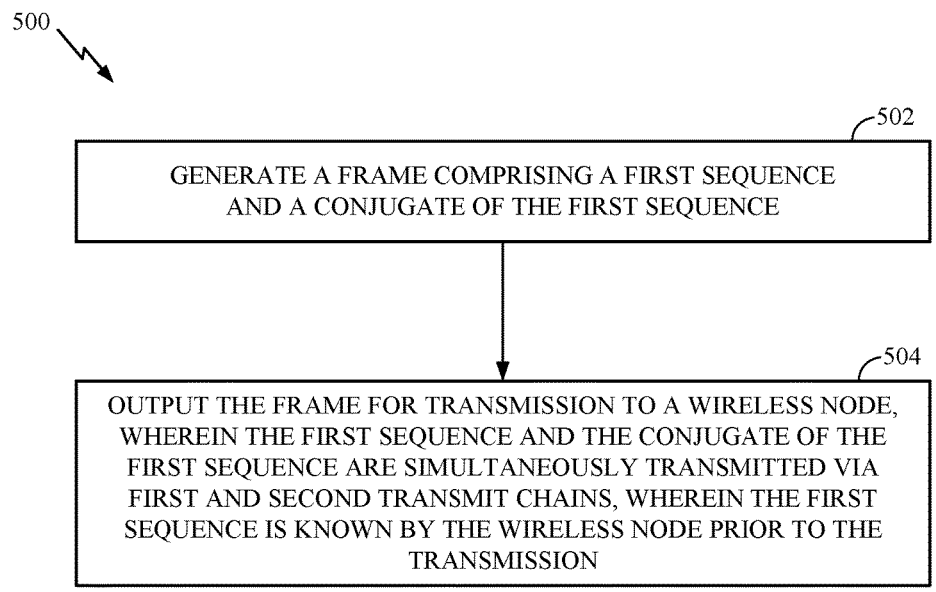
FIG. 5 illustrates example operations that may be performed by a wireless node configured to transmit channel estimation sequences (CES), in accordance with certain aspects of the present disclosure.
Figure 5A:
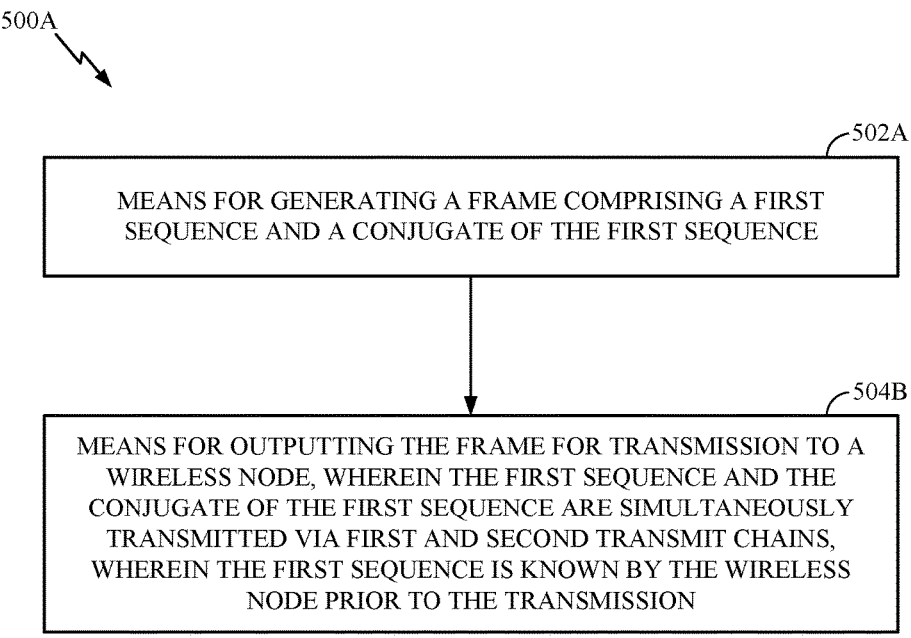
FIG. 5A illustrates example means capable of performing the operations illustrated in FIG. 5.

FIG. 5 illustrates example operations 500 for wireless communication, in accordance with aspects of the present disclosure. The operations 500 may be performed, for example, by a wireless node configured to transmit a known sequence (hereinafter referred to as a TX device).

The operations 500 begin, at 502, by generating a frame comprising a first sequence and a conjugate of the first sequence and, at 504, outputting the frame for transmission to another wireless node (e.g., an RX device), wherein the first sequence and the conjugate of the first sequence are simultaneously transmitted via first and second transmit chains. In certain aspects, the first sequence is known by the other wireless node prior to the transmission. In certain aspects, the first known sequence may comprise a channel estimation sequence (CES).

Figure 6:
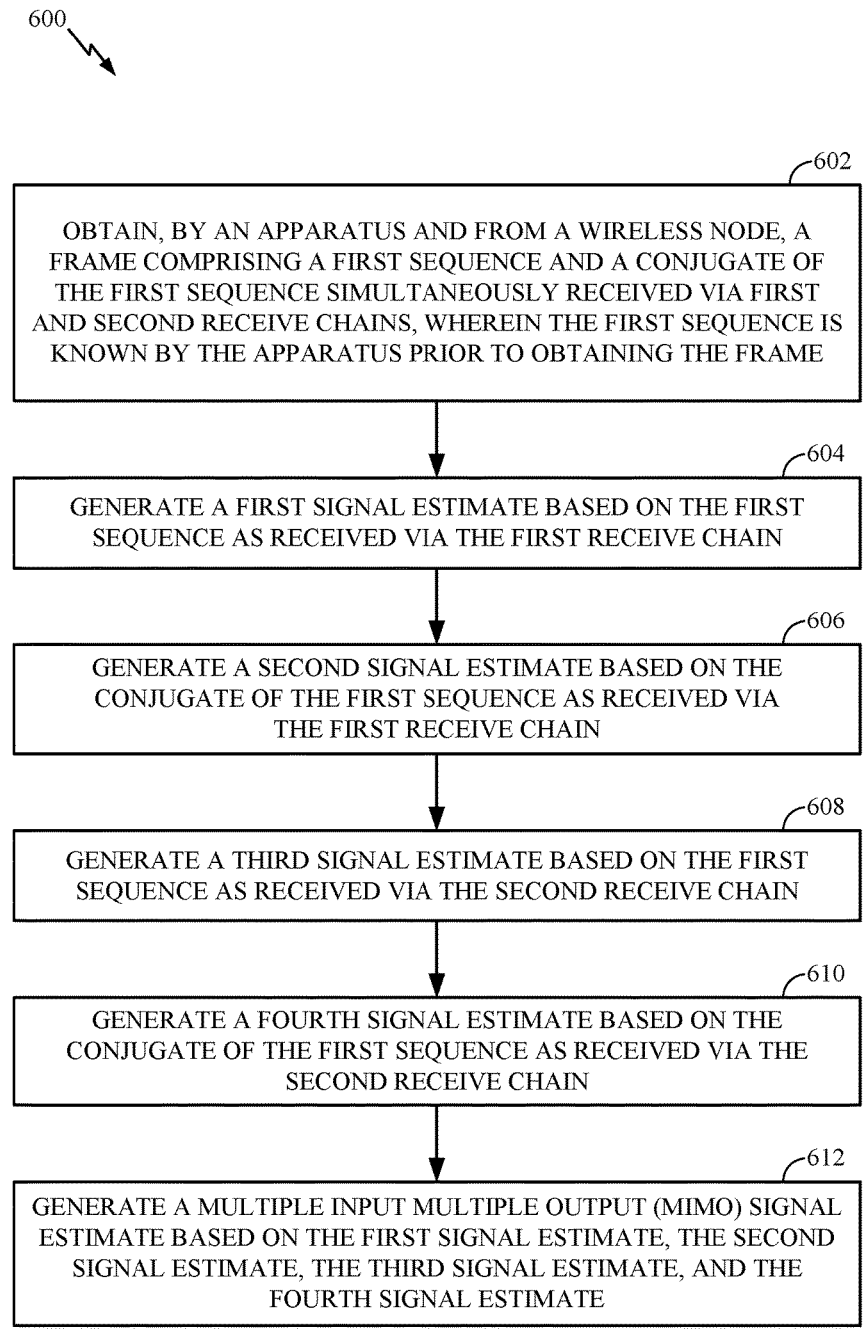
FIG. 6 illustrates example operations that may be performed by a wireless node configured to receive channel estimation sequences (CES), in accordance with certain aspects of the present disclosure.
Figure 6A:
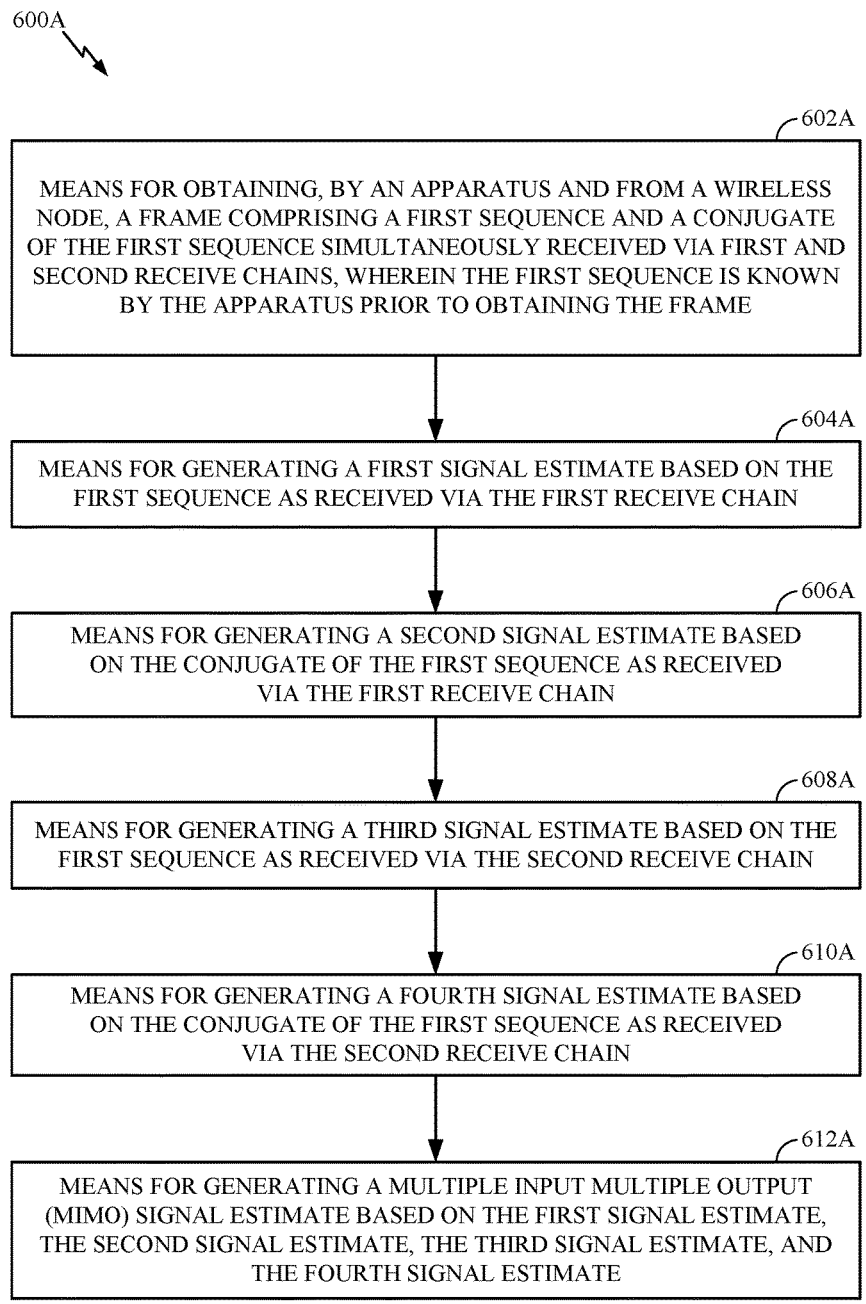
FIG. 6A illustrates example means capable of performing the operations illustrated in FIG. 6.

FIG. 6 illustrates example operations 600 for wireless communication, in accordance with aspects of the present disclosure. The operations 600 may be performed, for example, by a wireless node (hereinafter referred to as a RX device) configured to receive a known sequence and, for example, perform a multiple input multiple output (MIMO) signal estimate (e.g., using channel estimator 228 of FIG. 2) based on the received known sequence.

The operations 600 begin, at 602, by obtaining a frame comprising a first known sequence and a conjugate of the first known sequence simultaneously received at first and second receive chains. At 604, generating a first signal estimate based on the first sequence as received at the first receive chain. At 606, generating a second channel estimate based on the conjugate of the first sequence as received at the first receive chain. At 608, generating a third signal estimate based on the first known sequence as received at the second receive chain. At 610, generating a fourth signal estimate based on the conjugate of the first known sequence as received at the second receive chain. At 612, generating a multiple input multiple output (MIMO) signal estimate based on the first signal estimate, second signal estimate, third signal estimate, and fourth signal estimate. In certain aspects, the first sequence in the frame (e.g., as transmitted by the TX device) is known by the RX device prior to obtaining the frame. In certain aspects, the first sequence may comprise a channel estimation sequence (CES), and the first, second, third, and fourth signal estimates may comprise a channel estimate.

The operations carried out by the TX and RX devices as described with reference to FIGS. 5 and 6 are described in more detail using the block diagrams of FIGS. 7 and 8.

Figure 7:
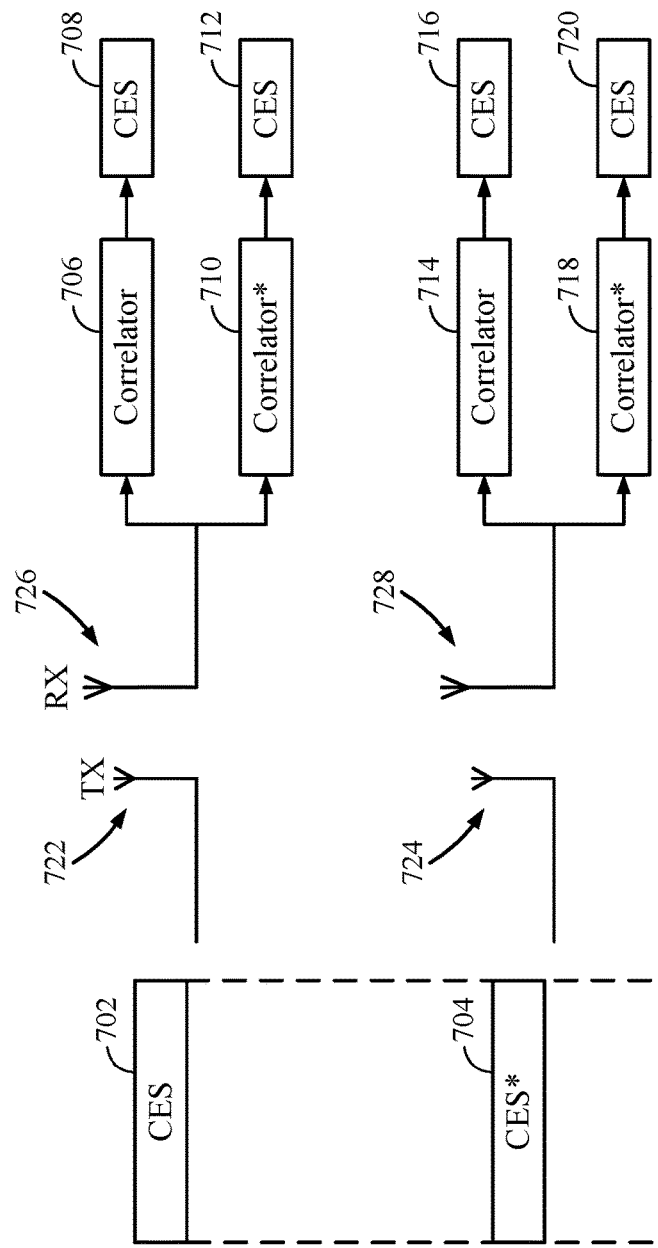
FIG. 7 illustrates an example block diagram for transmission and reception of CES for a 2×2 multiple-input-multiple-output (MIMO) system, in accordance with certain aspects of the present disclosure.

FIG. 7 illustrates a block diagram of a TX device transmitting channel estimation sequences to an RX device via a 2×2 MIMO system, in accordance with certain aspects of the present disclosure. The TX device may generate a frame comprising a CES 702 and another CES 704 that is the conjugate of the CES 702. The TX device may transmit the CES 702 and CES 704 simultaneously via a first transmit chain 722 and a second transmit chain 724.

In certain aspects, the CES 702 may be generated based on a linear combination (e.g., first linear combination) of an original CES and a conjugate of the original CES. That is, CES 702 may be generated based on the sum of an original CES and a conjugate of the original CES. In certain aspects, CES 704 (e.g., conjugate of CES 702) may be generated using a different linear combination (e.g., second linear combination) based on the original CES and the conjugate of the original CES. For example, CES 704 may be generated based on the original CES minus the conjugate of the original CES, such that CES 702 and CES 704 are orthogonal.

In some cases, performing the first and second linear combinations may involve multiplying the conjugate of the original CES by a value representing a complex phase (j). In certain aspects, the first CES (and conjugate thereof) may be a sequence of Golay codes.

An RX device may then obtain the frame comprising the CES 702 and the CES 704 simultaneously via a first receive chain 726 and second receive chain 728. Based on the received CES 702 and CES 704, the RX device may generate a MIMO channel estimate. For example, the RX device may generate a first channel estimate 708 based on the CES 702 as received at the receive chain 726, via correlator 706 (e.g., Golay correlator), generate a second channel estimate 712 based on CES 704 (conjugate of CES 702) as received at the receive chain 726, via correlator 710, generate a third channel estimate 716 based on the first CES as received at the receive chain 728, via correlator 714, and generate a fourth channel estimate 720 based on the conjugate of the first CES as received at the receive chain 728, via correlator 718.

Therefore, the TX device generates four channel estimations for a 2×2 MIMO system. Each channel estimate may have a length of 128 symbols, with an estimation noise of about SNR plus nine DB. Using the first, second, third, and fourth channel estimates, the RX device may then generate a MIMO channel estimate for the 2×2 MIMO system of FIG. 7.

In certain aspects, the second channel estimate 712 may be generated using a correlator that is also used in generating the channel estimate 708. For example, both the channel estimates 708 and 712 may be generated via the correlator 706. In this case, an input signal to the correlator 706 may be conjugated. In certain aspects, an in phase (I) and quadrature phase (Q) signals of the input to the correlator 706 may be swapped. For example, the correlator 706 may include in-phase (I) and quadrature-phase (Q) inputs (not shown). Therefore, swapping the in-phase (I) and quadrature phase (Q) signals may involve routing an in-phase (I) signal of the conjugate of a CES (e.g., CES 702 as received via receive chain 726) to the quadrature-phase (Q) input of the correlator 706 and routing a quadrature-phase (Q) signal of the conjugate of the CES to the in-phase input of the correlator 706.

Thus, the same hardware may be used for correlator 706 and correlator 710, to generate channel estimates 708 and 712. Similarly, the same hardware may be used to generate channel estimates 716 and 720. That is, a single correlator may be used for each receive chain to estimate a channel based on a CES and a conjugate of the CES received by the corresponding receive chain.

Figure 8:
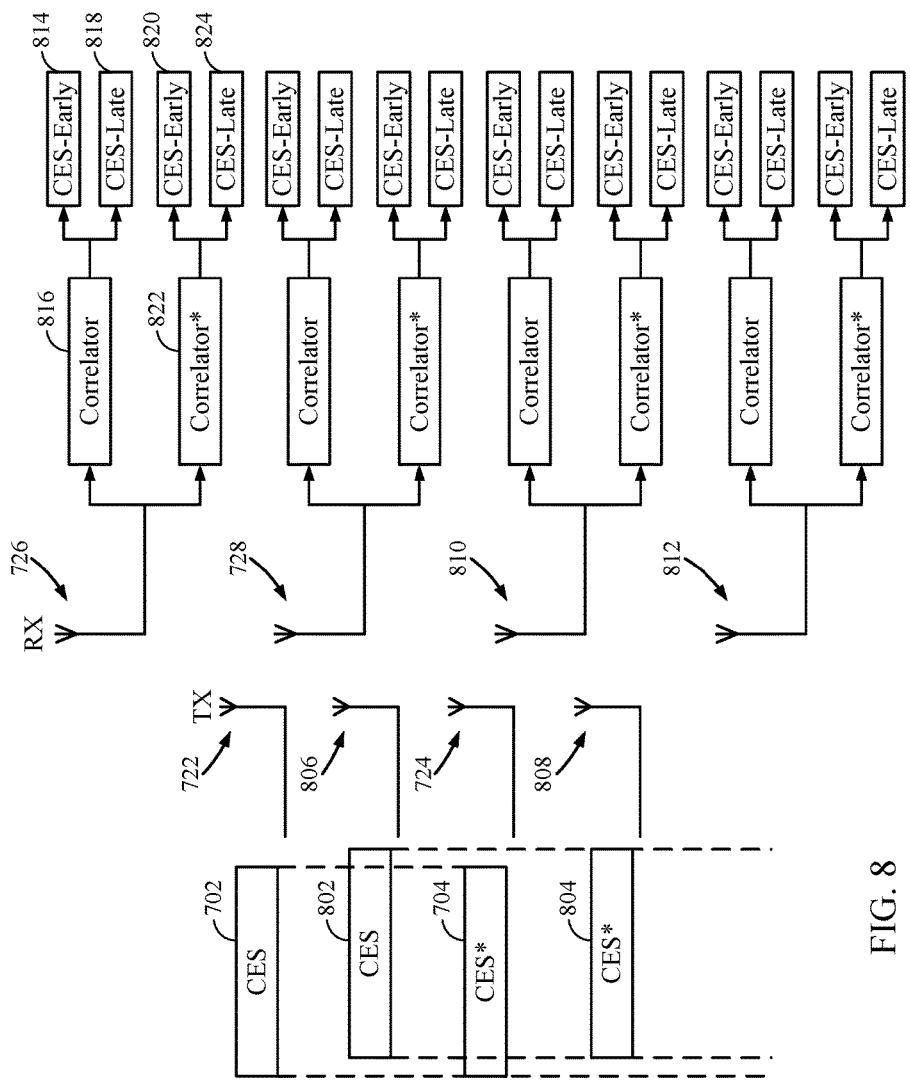
FIG. 8 illustrates an example block diagram for transmission and reception of CES for a 4×4 MIMO system, in accordance with certain aspects of the present disclosure.

FIG. 8 illustrates a block diagram of a TX device transmitting a plurality of channel estimation sequences, and conjugates thereof, to an RX device via a 4×4 MIMO system, in accordance with certain aspects of the present disclosure. For example, the frame as described with respect to FIG. 7 may further include a CES 802 and another CES 804, wherein CES 804 is a conjugate of the CES 802. As illustrated, the CES 802 and CES 804 may be transmitted, simultaneously, via a third transmit chain 806 and a fourth transmit chain 808. However, in certain aspects, the transmission of CES 802 and CES 804, may be delayed from the transmission of CES 702 and CES 704. For example, the transmission of CES 802 and CES 804 may be delayed by a time period determined or known to the TX device and RX device, which may be about 64 nanoseconds. As illustrated, the CES 802 and CES 804 may be at least partially overlapping in time. In certain aspects, CES 702 and CES 802 may comprise the same sequence of Golay codes.

The RX device then performs MIMO channel estimation based on CES 702, CES 704, CES 802, and CES 804, received via a first receive chain 726, second receive chain 728, third receive chain 810, and a fourth receive chain 812.

For example, the RX device may generate a first channel estimate 814 (e.g., CES Early) via correlator 816, based on CES 702 received at the receive chain 726, and a second channel estimate 818 (e.g., CES-Late), via correlator 816, based on CES 802 (e.g., same as CES 702, but delayed) received at the receive chain 726.

Moreover, a third channel estimate 820 and a fourth channel estimate 824 may be generated via correlator 822 based on CES 704 (e.g., conjugate of CES 702) and CES 804 (e.g., conjugate of CES 802), both received at the receive chain 726.

A similar process may be followed to generate channel estimates for CES received on a second transmit chain 728. In certain aspects, the RX device may generate channel estimates for CES received on a third transmit chain 810 and a fourth transmit chain 812, to generate a total of 16 channel estimates, which may have an estimation noise of about SNR plus nine dB, as illustrated in FIG. 8. Based on the channel estimates, the RX device may perform MIMO channel estimation.

In certain aspects, the frame may comprise at least one of a repetition of CES 702, CES 704, CES 802, or CES 804 in the time domain. Each of the repetitions of the CES 702, the CES 704, the CES 802, and the CES 804 may be transmitted later in time and using a different transmit chain than previously used for that CES. For example, where CES 702 is transmitted on a first transmit chain, a repetition of CES 702 may be transmitted on the third transmit. Likewise, where CES 704 is transmitted on a second transmit chain, a repetition of CES 704 may be transmitted on the fourth transmit chain.

In certain aspects, each of the repetitions of CES 702, CES 802, CES 704, and CES 804 may be generated by the TX device based on a corresponding CES sequence and a value representing a complex phase. For example, each of the repetitions of CES 702, CES 802, CES 704, and CES 804 may be generated by multiplying the corresponding CES sequence by the value representing a complex phase. The RX device may then generate the MIMO channel estimate by applying an inverse matrix corresponding to the value representing the complex phase to individual channel estimates generated based on at least one of the repetition of CES 702, CES 802, CES 704, or CES 804.

In certain aspects, the transmit chains used to transmit CES 702, 704, 802, and 804 may be coupled to a single antenna array. In other aspects, each transmit chain may be coupled to a separate antenna or a separate antenna array.

In certain aspects, the sequences of the IEEE 802.11 ad standard may be reused for the IEEE 802.11 ay MIMO channel estimation to achieve desired metrics and reduce the overhead of the channel estimation.

While example provided herein have described channel estimation for a 2×2 and 4×4 MIMO system to facilitate understanding, the techniques described herein can be applied to a MIMO system with any number of receive and transmit chains (e.g., may be applied to an N×M MIMO system). For example, aspects of the present disclosure may be implemented for 6×Nr, 8×Nr, 3×Nr, 5×Nr, or 7×Nr MIMO systems, where Nr could be any value.

For example, aspects of the present disclosure may be extended to more than 4 spatial streams, however, this may result in additional overheads. Channel estimation may be extended to more than 4 spatial streams by adding more time delay options. In certain aspects of the present disclosure, channel estimation may be extended to odd number of spatial streams by dropping one of the transmit chains from an even case. For example, channel estimation for a 3×3 MIMO system may be implemented by dropping one of the transmit chains of the 4×4 MIMO system described with respect to FIG. 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 may correspond to means 500A illustrated in FIG. 5A and operations 600 illustrated in FIG. 6 may correspond to means 600A illustrated in FIG. 6A.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the user terminal 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 254 of the user terminal 120 illustrated in FIG. 2. Means for processing, means for conjugating, means for routing, means for generating, means for performing frequency offset adjustment, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a processing system configured to generate a frame comprising:
 a first sequence and a conjugate of the first sequence, wherein the first sequence comprises a sequence of Golay codes rotated by $\pi/2$; and
 a second sequence and a conjugate of the second sequence; and
an interface configured to output the frame for transmission to a wireless node, wherein the first sequence and the conjugate of the first sequence are simultaneously transmitted via first and second transmit chains, wherein the first sequence is known by the wireless node prior to the transmission, and wherein the second sequence and the conjugate of the second sequence are outputted for transmission a time period after the first sequence and the conjugate of the first sequence were outputted for simultaneous transmission via the first and second transmit chains.

2. The apparatus of claim 1, wherein:
the first sequence is generated based on a first linear combination of an original sequence and a conjugate of the original sequence; and
the conjugate of the first sequence is generated based on a second linear combination of the original sequence and the conjugate of the original sequence.

3. The apparatus of claim 1, wherein:
the second sequence and the conjugate of the second sequence are simultaneously transmitted via third and fourth transmit chains, wherein the second sequence is known by the wireless node prior to the transmission of the second sequence.

4. The apparatus of claim 3, wherein simultaneous transmission of the second sequence and the conjugate of the second sequence via the third and fourth transmit chains at least partially overlaps with simultaneous transmission of the first sequence and the conjugate of the first sequence via the first and second transmit chains.

5. The apparatus of claim 3, wherein:
the frame further comprises at least one of a repetition of the first sequence, a repetition of the conjugate of the first sequence, a repetition of the second sequence, or a repetition of the conjugate of the second sequence; and
each of the repetitions of the first sequence, the second sequence, the conjugate of the first sequence, and the conjugate of the second sequence is transmitted later in time and using a different transmit chain than a previous transmission of the first sequence, the second sequence, the conjugate of the first sequence, and the conjugate of the second sequence.

6. An apparatus for wireless communication, comprising:
an interface configured to obtain, from a wireless node, a frame comprising:
 a first sequence and a conjugate of the first sequence simultaneously obtained via first and second receive chains, wherein the first sequence is known by the apparatus prior to obtaining the frame, and wherein the first sequence comprises a sequence of Golay codes rotated by $\pi/2$; and
 a second sequence and a conjugate of the second sequence, wherein the second sequence and the conjugate of the second sequence are obtained a time period after the first sequence and the conjugate of the first sequence were obtained via the first and second receive chains; and
a processing system configured to generate a first signal estimate based on the first sequence as obtained via the first receive chain, generate a second signal estimate based on the conjugate of the first sequence as obtained via the first receive chain, generate a third signal estimate based on the first sequence as obtained via the second receive chain, and generate a fourth signal estimate based on the conjugate of the first sequence as obtained via the second receive chain, and to generate a multiple input multiple output (MIMO) signal estimate based on the first signal estimate, the second signal estimate, the third signal estimate, and the fourth signal estimate.

7. The apparatus of claim 6, wherein the first sequence comprises a channel estimation sequence (CES), and wherein the first, second, third, and fourth signal estimates comprise a channel estimate.

8. The apparatus of claim 6, wherein:
the second sequence and the conjugate of the second sequence are simultaneously obtained via the first and second receive chains at a time period after obtaining the first sequence and the conjugate of the first sequence, wherein the second sequence in the frame is known by the apparatus prior to obtaining the frame; and
the processing system is further configured to generate a fifth signal estimate based on the second sequence as obtained via the first receive chain, generate a sixth signal estimate based on the conjugate of the second sequence as obtained via the first receive chain, generate a seventh signal estimate based on the second sequence as obtained via the second receive chain, and generate an eighth signal estimate based on the conjugate of the second sequence as obtained via the second receive chain.

9. The apparatus of claim 6, wherein:
the processing system further comprises a first correlator configured to generate the first and second signal estimates, the first correlator having in-phase and quadrature-phase inputs, and
the processing system is configured to generate the second signal estimate by:
conjugating an input signal to the first correlator, or
routing an in-phase signal of the conjugate of the first sequence to the quadrature-phase input of the first correlator and routing a quadrature-phase signal of the conjugate of the first sequence to the in-phase input of the first correlator.

10. The apparatus of claim 8, wherein:
the processing system is further configured to generate the MIMO signal estimate based on the first sequence as obtained via a third receive chain, the conjugate of the first sequence as obtained via the third receive chain, the first sequence as obtained via a fourth receive chain, and the conjugate of the first sequence as obtained via the fourth receive chain, the second sequence as obtained via the third receive chain, the conjugate of the second sequence as obtained via the third receive chain, the second sequence as obtained via the fourth receive chain, and the conjugate of the second sequence as obtained via the fourth receive chain.

11. The apparatus of claim 8, wherein:
the frame further comprises at least one of a repetition of the first sequence, a repetition of the conjugate of the first sequence, a repetition of the second sequence, or a repetition of the conjugate of the second sequence; and
the processing system is further configured to generate the MIMO signal estimate based on at least one of the repetition of the first sequence, the repetition of the conjugate of the first sequence, the repetition of the second sequence, or the repetition of the conjugate of the second sequence, as obtained via the first and second receive chains.

12. The apparatus of claim 11, wherein:
the processing system is further configured to generate the MIMO signal estimate based on at least one of the repetition of the first sequence, the repetition of the conjugate of the first sequence, the repetition of the second sequence, or the repetition of the conjugate of the second sequence, as obtained via third and fourth receive antennas.

13. The apparatus of claim 11, wherein:
each of the repetition of the first sequence, the repetition of the conjugate of the first sequence, the repetition of the second sequence, and the repetition of the conjugate of the second sequence is generated based on a corresponding sequence and a value representing a complex phase; and
the processing system is configured to generate the MIMO signal estimate by applying an inverse matrix corresponding to the value representing the complex phase to individual signal estimates generated based on at least one of the repetition of the first sequence, the repetition of the conjugate of the first sequence, the repetition of the second sequence, or the repetition of the conjugate of the second sequence.

14. A method for wireless communication, comprising:
generating a frame comprising:
a first sequence and a conjugate of the first sequence, wherein the first sequence comprises a sequence of Golay codes rotated by $\pi/2$; and
a second sequence and a conjugate of the second sequence; and
outputting the frame for transmission to a wireless node, wherein the first sequence and the conjugate of the first sequence are simultaneously transmitted via first and second transmit chains, wherein the first sequence is known by the wireless node prior to the transmission, and wherein the second sequence and the conjugate of the second sequence are outputted for transmission a time period after the first sequence and the conjugate of the first sequence were outputted for simultaneous transmission via the first and second transmit chains.

15. The method of claim 14, wherein:
the first sequence is generated based on a first linear combination of an original sequence and a conjugate of the original sequence; and
the conjugate of the first sequence is generated based on a second linear combination of the original sequence and the conjugate of the original sequence.

16. The method of claim 14, wherein the second sequence and the conjugate of the second sequence are simultaneously transmitted via third and fourth transmit chains, wherein the second sequence is known by the wireless node prior to the transmission of the second sequence.

17. The method of claim 16, wherein simultaneous transmission of the second sequence and the conjugate of the second sequence via the third and fourth transmit chains at least partially overlaps with simultaneous transmission of the first sequence and the conjugate of the first sequence via the first and second transmit chains.

18. The method of claim 16, wherein:
the frame further comprises at least one of a repetition of the first sequence, a repetition of the conjugate of the first sequence, a repetition of the second sequence, or a repetition of the conjugate of the second sequence; and
each of the repetitions of the first sequence, the second sequence, the conjugate of the first sequence, and the conjugate of the second sequence is transmitted later in time and using a different transmit chain than a previous transmission of the first sequence, the second sequence, the conjugate of the first sequence, and the conjugate of the second sequence.

19. A method for wireless communication, comprising:
obtaining, by an apparatus and from a wireless node, a frame comprising:
a first sequence and a conjugate of the first sequence simultaneously obtained via first and second receive chains, wherein the first sequence is known by the apparatus prior to obtaining the frame, and wherein the first sequence comprises a sequence of Golay codes rotated by $\pi/2$; and
a second sequence and a conjugate of the second sequence, wherein the second sequence and the conjugate of the second sequence are obtained a time period after the first sequence and the conjugate of the first sequence were obtained via the first and second receive chains; and
generating a first signal estimate based on the first sequence as obtained via the first receive chain;
generating a second signal estimate based on the conjugate of the first sequence as obtained via the first receive chain;
generating a third signal estimate based on the first sequence as obtained via the second receive chain;
generating a fourth signal estimate based on the conjugate of the first sequence as obtained via the second receive chain; and
generating a multiple input multiple output (MIMO) signal estimate based on the first signal estimate, the second signal estimate, the third signal estimate, the fourth signal estimate.

20. The method of claim 19, wherein the first sequence comprises a channel estimation sequence (CES), and wherein the first, second, third, and fourth signal estimates comprise a channel estimate.

21. The method of claim 19, further comprising:
receiving, simultaneously, the second sequence and the conjugate of the second sequence via the first and second receive chains at a time period after obtaining the first sequence and the conjugate of the first sequence, wherein the second sequence in the frame is known by the apparatus prior to obtaining the frame;
generating a fifth signal estimate based on the second sequence as obtained via the first receive chain;
generating a sixth signal estimate based on the conjugate of the second sequence as obtained via the first receive chain;
generating a seventh signal estimate based on the second sequence as obtained via the second receive chain; and
generating an eighth signal estimate based on the conjugate of the second sequence as obtained via the second receive chain.

22. The method of claim 19, wherein:
the first and second signal estimates are generated using a first correlator, the first correlator having in-phase and quadrature-phase inputs, and
generating the second signal estimate comprises:
conjugating an input signal to the first correlator, or
routing an in-phase signal of the conjugate of the first sequence to the quadrature-phase input of the first correlator and routing a quadrature-phase signal of the conjugate of the first sequence to the in-phase input of the first correlator.

23. The method of claim 21, wherein the method comprises generating the MIMO signal estimate based on the first sequence as obtained via a third receive chain, the conjugate of the first sequence as obtained via the third receive chain, the first sequence as obtained via a fourth receive chain, and the conjugate of the first sequence as obtained via the fourth receive chain, the second sequence as obtained via the third receive chain, the conjugate of the second sequence as obtained via the third receive chain, the second sequence as obtained via the fourth receive chain, and the conjugate of the second sequence as obtained via the fourth receive chain.

24. The method of claim 21, wherein the frame further comprises at least one of a repetition of the first sequence, a repetition of the conjugate of the first sequence, a repetition of the second sequence, or a repetition of the conjugate of the second sequence; and
the method comprises generating the MIMO signal estimate based on at least one of the repetition of the first sequence, the repetition of the conjugate of the first sequence, the repetition of the second sequence, or the repetition of the conjugate of the second sequence, as obtained via the first and second receive chains.

25. The method of claim 24, wherein the method comprises generating the MIMO signal estimate based on at least one of the repetition of the first sequence, the repetition of the conjugate of the first sequence, the repetition of the second sequence, or the repetition of the conjugate of the second sequence, as obtained via third and fourth receive antennas.

26. The method of claim 24, wherein each of the repetition of the first sequence, the repetition of the conjugate of the first sequence, the repetition of the second sequence, and the repetition of the conjugate of the second sequence is generated based on a corresponding sequence and a value representing a complex phase; and
the method comprises generating the MIMO signal estimate by applying an inverse matrix corresponding to the value representing the complex phase to individual signal estimates generated based on at least one of the repetition of the first sequence, the repetition of the conjugate of the first sequence, the repetition of the second sequence, or the repetition of the conjugate of the second sequence.

27. The apparatus of claim 1, further comprising at least one antenna, wherein the interface is configured to output the frame for transmission via the at least one antenna, and wherein the apparatus is configured as another wireless node.

28. The apparatus of claim 6, further comprising at least one antenna, wherein the interface is configured to obtain the frame via the at least one antenna, and wherein the apparatus is configured as another wireless node.

* * * * *